US010535856B2

(12) United States Patent
Gotoh et al.

(10) Patent No.: US 10,535,856 B2
(45) Date of Patent: Jan. 14, 2020

(54) BUS BAR MODULE AND BUS BAR MODULE MANUFACTURING METHOD

(71) Applicant: YAZAKI CORPORATION, Tokyo (JP)

(72) Inventors: Takuto Gotoh, Shizuoka (JP); Naoyuki Ikeda, Shizuoka (JP); Nobuaki Yoshioka, Shizuoka (JP); Yoshiaki Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 138 days.

(21) Appl. No.: 15/381,553

(22) Filed: Dec. 16, 2016

(65) Prior Publication Data
US 2017/0179460 A1 Jun. 22, 2017

(30) Foreign Application Priority Data

Dec. 18, 2015 (JP) .................................. 2015-247965

(51) Int. Cl.
*H01M 2/20* (2006.01)
*H01M 2/10* (2006.01)
*H01R 4/02* (2006.01)
*H02G 5/02* (2006.01)

(52) U.S. Cl.
CPC ......... *H01M 2/206* (2013.01); *H01M 2/1077* (2013.01); *H01R 4/027* (2013.01); *H01R 4/029* (2013.01); *H02G 5/02* (2013.01); *H01M 2220/20* (2013.01)

(58) Field of Classification Search
CPC ....................... H01M 2/20–208; H01M 2/1077
See application file for complete search history.

(56) References Cited

U.S. PATENT DOCUMENTS

2014/0363711 A1* 12/2014 Zhao .................... H01M 10/486
429/90
2015/0263326 A1 9/2015 Gunther et al.
2017/0263911 A1 9/2017 Gunther et al.

FOREIGN PATENT DOCUMENTS

| CN | 103811708 A | 5/2014 |
| CN | 104916804 A | 9/2015 |
| CN | 105308770 A | 2/2016 |
| JP | 2010-114025 A | 5/2010 |
| JP | 2015-133223 A | 7/2015 |

OTHER PUBLICATIONS

Chinese Office Action for the related Chinese Patent Application No. 201611177481.9 dated Dec. 28, 2018.

* cited by examiner

Primary Examiner — Stephan J Essex
(74) Attorney, Agent, or Firm — Kenealy Vaidya LLP

(57) ABSTRACT

A bus bar module includes a plurality of bus bars that connects a plurality of unit cells of a battery assembly constituted by the unit cells, a plurality of electric wires that are welded to surfaces of the bus bars, and an electric wire router that is made of insulating resin and includes bus bar reception portions provided side by side in an array direction of the unit cells, wherein each of the bus bar reception portions includes an opening portion that is formed to be opposed to a back surface of a corresponding one of the bus bars in accordance with a connection portion with a conductor of a corresponding one of the electric wires, and an electric wire tip holding portion that holds the vicinity of a welding portion of the conductor.

3 Claims, 9 Drawing Sheets

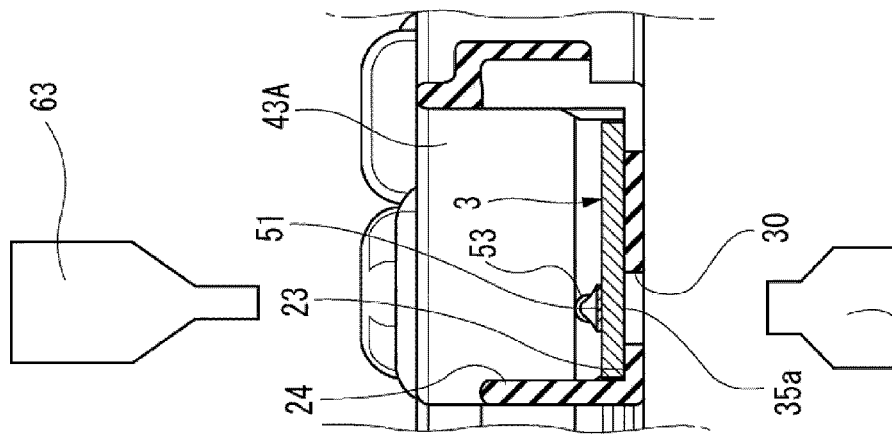
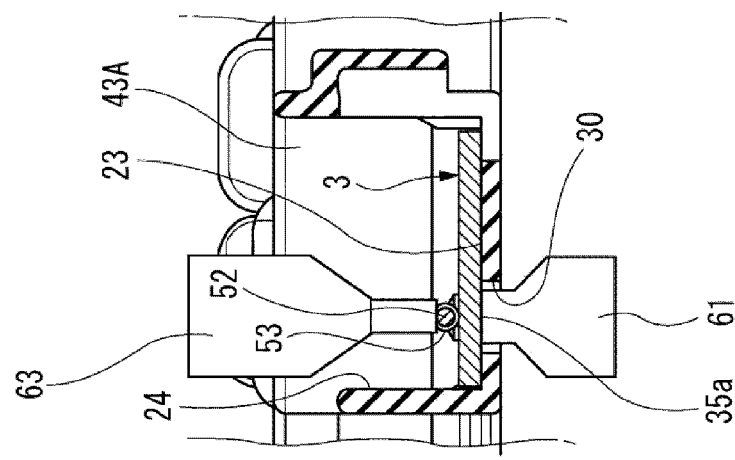
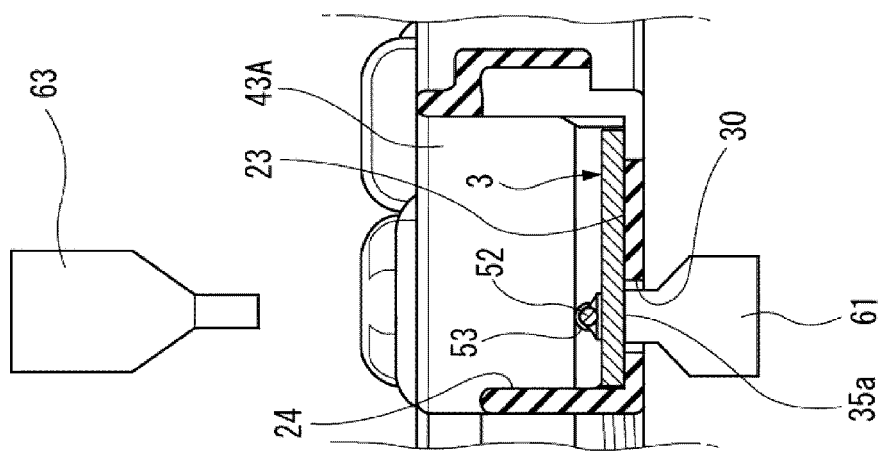

BUS BAR MODULE AND BUS BAR MODULE MANUFACTURING METHOD

CROSS REFERENCE TO RELATED APPLICATIONS

This application claims a benefit of Japanese Patent Application No. 2015-247965 filed on Dec. 18, 2015, the contents of which are incorporated herein by reference.

BACKGROUND OF THE INVENTION

1. Technical Field

The present invention relates to a bus bar module and a method for manufacturing the sub bar module.

2. Background Art

A battery module is formed in an on-vehicle battery pack to be connected to a power conversion apparatus for driving a motor in a vehicle such as a hybrid car or an electric car, as follows. That is, a large number of battery cells are disposed side by side and stacked on one another alternately reversely so that a positive electrode terminal and a negative electrode terminal can be placed adjacently to each other between adjacent ones of the battery cells. Electrode terminals of adjacent ones of the battery cells are connected to each other by a connection member so that the battery cells can be connected to one another in series or in parallel.

When a battery module configured thus is assembled, electrodes terminals have to be connected at a plurality of places through bus bars. To this end, a bus bar module in which a plurality of bus bars disposed in a mold have been integrally formed with bus bar reception portions made of insulating resin is used, or a bus bar module in which bus bars have been received in bus bar reception portions in an electric wire router made of insulating resin is used.

When a plurality of battery cells are connected in series or in parallel, unevenness in battery characteristic such as battery voltage among the battery cells may cause deterioration or damage on the battery. Therefore, in an on-vehicle battery pack, a voltage detection wire for detecting a voltage of each battery cell is attached to each bus bar in order to suspend charging and discharging before abnormality occurs in voltage among the battery cells.

The following structure has been used in a background-art bus bar module. That is, coating at a tip of a coated wire is stripped in each voltage detection wire, and a round terminal is crimped to a core wire (conductor) of the coated wire. The round terminal is fitted to an electrode terminal of a battery cell, and jointly fastened to the electrode terminal together with a bus bar by a nut.

On the other hand, as shown in FIGS. 9A and 9B, for example, in a high voltage detection module device 510 of a battery pack disclosed in JP-A-2010-114025, a plurality of bus bars 512 are disposed in an insulating frame 511 fitted to a battery pack body so that predetermined positive terminals and negative terminals of battery cells can be connected to each other. A flat cable 513 is disposed in a region of the insulating frame 511 other than the region where the bus bars 512 are disposed. The flat cable 513 is cut into a predetermined shape so that respective conductor wires can be separated from one another while their roots are left as they are. The conductor wires separated thus are welded with predetermined ones of the bus bars 512 respectively.

According to the high voltage detection module device 510 of a battery pack configured thus, the high voltage detection module device 510 can be formed by simple work, that is, disposing the bus bars 512 on the insulating frame 511, separating the conductor wires of the flat cable 513 from one another, and welding the conductor wires with the bus bars 512 respectively.

When a conductor of an electric wire is connected with a bus bar by welding connection, a suitable configuration is required in accordance with a welding method. For example, resistance welding requires a configuration for bringing electrodes into contact with the conductor and the bus bar. In the case of ultrasonic welding, a welding portion between the conductor and the bus bar has to be held between a horn and an anvil. In the case of laser welding, the conductor has to be retained in contact with the bus bar.

However, in the aforementioned high-voltage detection module device 510, there is no disclosure about a configuration required for welding the conductor wires with the bus bars 512. When the conductor wires are welded with the bus bars 512, reliability in electric connection may be lowered or workability in welding may deteriorate.

The present invention has been developed in consideration of the aforementioned situation. An object of the invention is to provide a bus bar module and a method for manufacturing the same, in which reliability in electric connection in a welding portion between a conductor and a bus bar can be improved, and workability in welding is good.

SUMMARY

The aforementioned object of the invention is attained by the following configurations.

(1) A bus bar module including a plurality of bus bars that establish mutual electric connections among a plurality of unit cells of a battery assembly constituted by the unit cells, a plurality of electric wires that are connected and welded to surfaces of the bus bars respectively, and an electric wire router that is made of insulating resin, the electric wire router including a plurality of bus bar reception portions, the bus bar reception portions being provided side by side in an array direction of the unit cells, the bus bars being received in the bus bar reception portions respectively; wherein each of the bus bar reception portions includes: an opening portion that is formed to be opposed to a back surface of a corresponding one of the bus bars in accordance with a connection portion with a conductor of a corresponding one of the electric wires; and an electric wire tip holding portion that is provided adjacently to the opening portion so as to hold the vicinity of a welding portion of the conductor.

According to the bus bar module having the aforementioned configuration (1), each bus bar reception portion has an opening portion opposed to a back surface of a corresponding one of the bus bars in accordance with a connection portion with a conductor of an electric wire in the surface of the bus bar. Therefore, when an ultrasonic bonding horn (first work) is brought into contact with the connection portion with the conductor, an anvil (second work) can be brought into the back surface of the bus bar to clamp the bus bar directly. Alternatively, when a resistance welding electrode (first work) is brought into contact with the connection portion with the conductor, a mating electrode (second work) can be brought into contact with the back surface of the bus bar to clamp the bus bar directly. As a result, the conductor and the bus bar can be welded stably so that the reliability of electric connection in the welding portion can be improved.

Further, the vicinity of the welding portion of the conductor is held by the electric wire tip holding portion. Accordingly, it is not necessary to perform positioning by a jig or the like during welding work. Thus, it is possible to route the conductor of the electric wire and the bus bar in the bus bar reception portion before they are welded and connected. To route an electric wire in the background art, a bus bar to which a conductor of an electric wire has been welded is received in a bus bar reception portion and routed therein. However, it is not necessary to take into consideration a load which may be applied to the welding portion during the routing work in the background art. As a result, it will go well only if strength required for reliability of electric connection in the welding portion can be secured. Thus, an effect to simplify the structure of a product and an effect to reduce the cost can be expected.

(2) A bus bar module according to the aforementioned configuration (1), wherein: the electric wire router includes electric wire routing portions that receive the electric wires in a stacking direction of the unit cells; and each of the electric wire routing portions includes an electric wire holding portion that holds the electric wire extending from the tip portion side of the conductor held by a corresponding one of the electric wire tip holding portions in a state where the electric wire has been bent at least once.

According to the bus bar module having the aforementioned configuration (2), the electric wire holding portion of each electric wire routing portion holds the electric wire extending from the tip portion side of the conductor held by a corresponding one of the electric wire tip holding portions in a loosened state where the electric wire has been bent at least once. Thus, it is possible to reduce the load of a horn when vibration for ultrasonic bonding is applied to the connection portion with the conductor. That is, when the electric wire is held in the loosened state, the conductor in the connection portion can be vibrated so easily that ultrasonic vibration energy of the horn can be transmitted efficiently.

(3) A method for manufacturing a bus bar module including a plurality of bus bars that establish mutual electric connections among a plurality of unit cells of a battery assembly constituted by the unit cells, a plurality of electric wires that are connected and welded to surfaces of the bus bars respectively, and an electric wire router including electric wire routing portions that receive the electric wires in a stacking direction of the unit cells, and a plurality of bus bar reception portions that are provided side by side in an array direction of the unit cells, the bus bars being received in the bus bar reception portions, the method including the steps of: receiving the bus bars in the bus bar reception portions; receiving the electric wires in the electric wire routing portions; holding the vicinity of a welding portion of each of the electric wires by an electric wire tip holding portion of a corresponding one of the bus bar reception portions; and welding and connecting a connection portion with a conductor of each of the electric wires to be welded and connected to surfaces of the bus bars respectively while clamping each of the bus bars between a first work brought into contact with the conductor and a second work passed through an opening portion of a corresponding one of the bus bar reception portions and brought into a back surface of the bus bar.

According to the method for manufacturing the bus bar module having the aforementioned configuration (3), before each bus bar and the conductor of a corresponding one of the electric wires are welded and connected to each other, the bus bar can be received in a corresponding one of the bus bar reception portions, and the electric wire can be routed in a corresponding one of the electric wire routing portions and a corresponding one of the bus bar reception portions. Therefore, welding can be performed sequentially in the state where the bus bars have been received in the bus bar reception portions respectively and the conductors of the electric wires have been set in the electric wire router. Accordingly, the effect of reducing the cost can be expected in comparison with welding for a single shot at a time.

According to a bus bar module and a method for manufacturing the same according to the invention, reliability in electric connection in a welding portion between a conductor and a bus bar can be improved, and workability in welding can be enhanced to reduce the manufacturing cost.

The invention has been described briefly above. The further details of the invention will be made clearer if the following Mode for Carrying Out the Invention (hereinafter referred to as "embodiment") is read through with reference to the accompanying drawings.

BRIEF DESCRIPTION OF DRAWINGS

FIGS. 7A to 7C are main portion sectional views for explaining steps for manufacturing the bus bar module.

FIG. 9A is a plan view, and FIG. 9B is a side view.

DETAILED DESCRIPTION OF EMBODIMENTS

Figure 1:
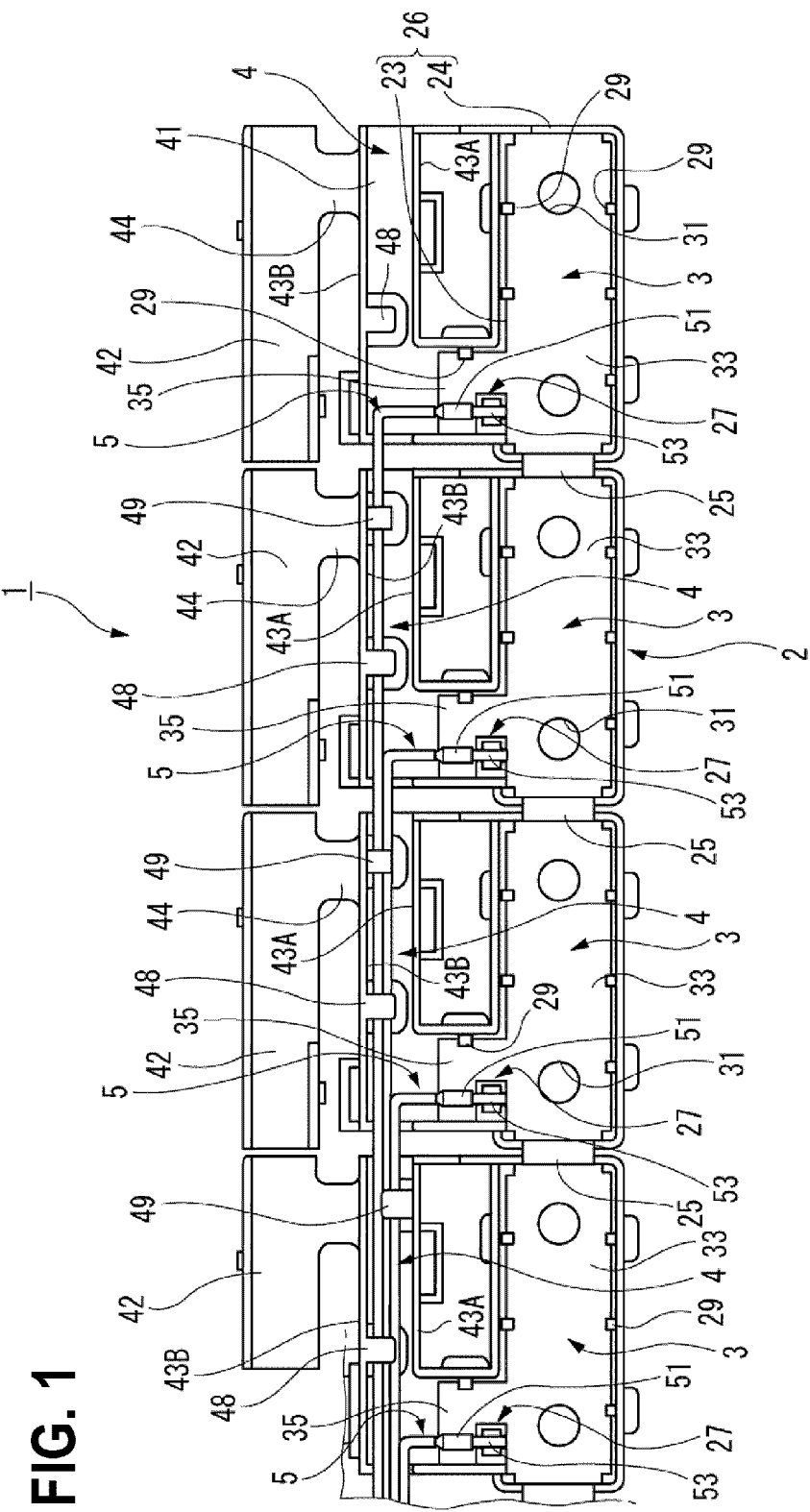
FIG. 1 is a partial plan view showing a bus bar module according to an embodiment of the invention.
Figure 2:
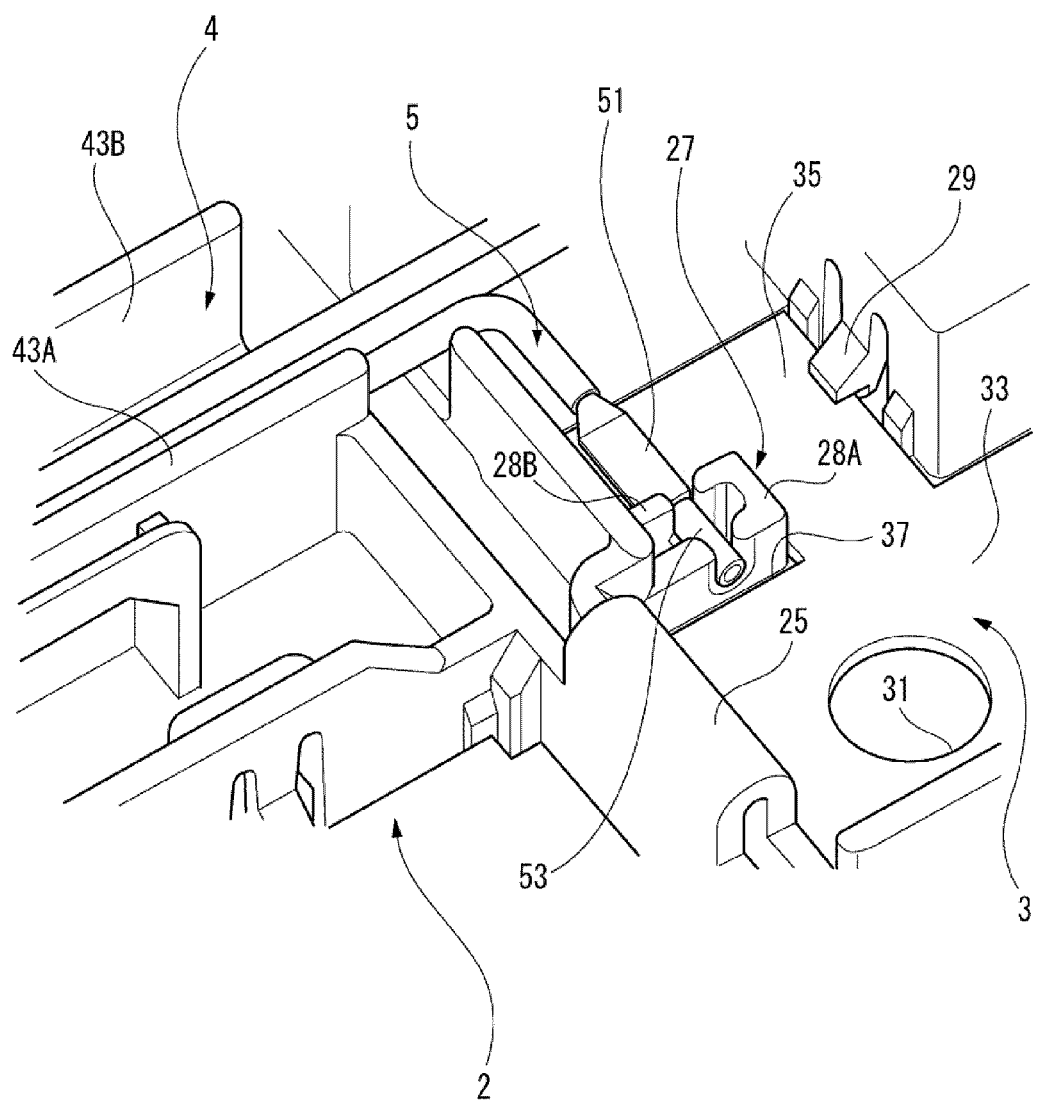
FIG. 2 is a main portion enlarged perspective view showing the bus bar module shown in FIG. 1.
Figure 3:
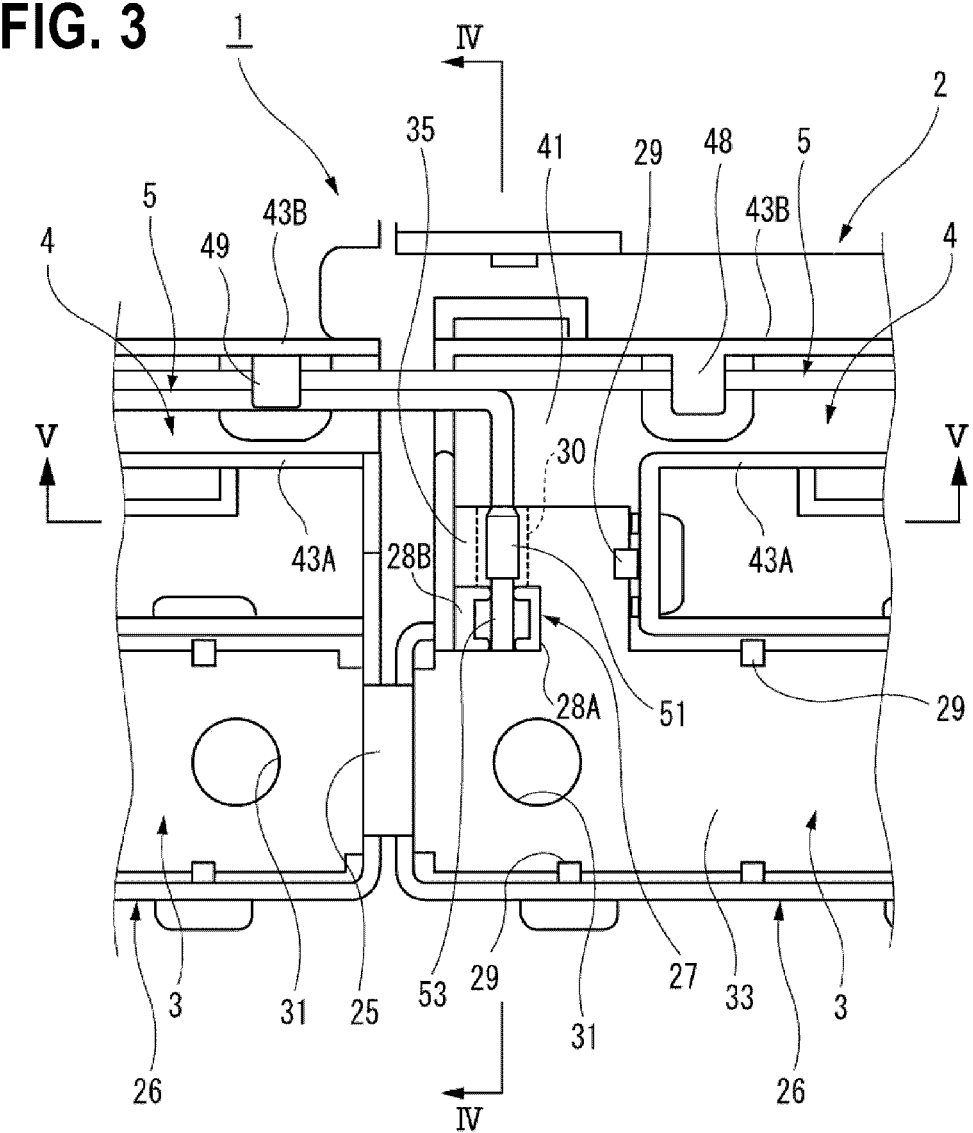
FIG. 3 is a main portion enlarged plan view showing the bus bar module shown in FIG. 1.

An embodiment of a bus bar module and a method for manufacturing the same according to the invention will be described below with reference to the drawings.

A bus bar module 1 according to the embodiment is attached to a battery assembly (not shown) constituted by a plurality of unit cells, so that electric power from the battery assembly can be supplied to an electric motor of an electric car, a hybrid car, or the like. The electric car travels using the electric motor. The hybrid car travels using the electric motor together with an engine.

As shown in FIG. 1 to FIG. 5, the bus bar module 1 according to the embodiment of the invention includes a plurality of bus bars 3, a plurality of voltage detection wires (electric wires) 5, and an electric wire router 2. The bus bars 3 electrically connects unit cells of the battery assembly with one another. The voltage detection wires 5 are welded and connected with the surfaces of the bus bars 3 respectively. The electric wire router 2 is made of insulating resin and provided with a plurality of bus bar reception portions 26, which are provided side by side in an array direction of the unit cells. The bus bars 3 are received in the bus bar reception portions 26.

The battery assembly includes a plurality of unit cells, and members for stacking and fixing the unit cells to one another. Each unit cell has a cell body, and a pair of positive and negative terminals. The cell body has a rectangular parallelepiped shape. The positive and negative terminals are electrode terminals projecting from one and the other ends of an upper surface of the battery body respectively. Each of the positive and negative terminals is formed out of conductive metal and into a columnar shape. In the battery assembly, the unit cells are stacked on one another alternately reversely so that positive terminals and negative terminals can be disposed adjacently to each other. In the battery assembly, the positive terminals and the negative terminals are connected by the bus bars 3 in the same manner as in the background art. Thus, a series-connection circuit is formed between adjacent ones of the unit cells so that a high DC voltage can be obtained.

Each bus bar 3 according to the embodiment can be obtained by press working on a conductive metal plate. The bus bar 3 includes a bus bar body portion 33 and a conductor connection portion 35. The bus bar body portion 33 has a rectangular plate-like shape, which is provided with a pair of terminal holes 31. The conductor connection portion 35 is provided to extend from a side edge portion of the bus bar body portion 33.

Of unit cells adjacent to each other, a positive terminal and a negative terminal adjacent to each other are inserted into the pair of terminal holes 31 of the bus bar body portion 33 respectively. Nuts (not shown) are screwed down to the positive terminal and the negative terminal inserted into the pair of terminal holes 31 respectively so that the bus bar 3 can be fixed to the unit cells. Not to say, when the bus bar according to the invention is welded and connected to the positive terminal and the negative terminal, the terminal holes 31 are not formed in the bus bar body portion 33.

A notch portion 37 for avoiding interference with an electric wire tip holding portion 27, which will be described later, is formed in the conductor connection portion 35. Thus, the conductor connection portion 35 protrudes in an approximately L-shape from one side edge portion of the bus bar body portion 33. A welding connection portion 51 of a voltage detection wire 5 is welded and connected to a tip portion of the conductor connection portion 35 protruding in an approximately L-shape, as shown in FIG. 2 to FIG. 5.

The bus bars 3 are received in the bus bar reception portions 26 respectively. Each bus bar reception portion 26 is constituted by a bottom wall 23 and a circumferential wall 24. The bottom wall 23 has a plate-like shape corresponding to the outer shape of the bus bar 3. The circumferential wall 24 is provided erectly and perpendicularly from the circumferential edge of the bottom wall 23. The bus bar reception portions 26 provided side by side in the stacking direction of the unit cells form the electric wire router 2 together with electric wire routing portions 4 receiving the voltage detection wires 5 in the stacking direction of the unit cells. That is, the electric wire router 2 is integrally formed out of insulating resin and into a rectangular parallelepiped shape long in the connecting direction of the bus bar reception portions 26.

Each electric wire routing portion 4 is formed into a bucket-like shape having an approximately U-shape in section. The electric wire routing portion 4 is constituted by a rectangular plate-like bottom wall 41, and a pair of side walls 43A and 43B provided erectly and perpendicularly from opposite edge portions of the bottom wall 41 opposed to each other in the width direction thereof.

The electric wire routing portions 4 are provided on side edge along the array of the bus bar reception portions 26, and connected to the bus bar reception portions 26 respectively. Thus, the electric wire routing portions 4 arranged side by side form a routing space in which the voltage detection wires 5 extracted from the bus bar reception portions 26 respectively can be routed in the stacking direction of the unit cells.

Figure 4:
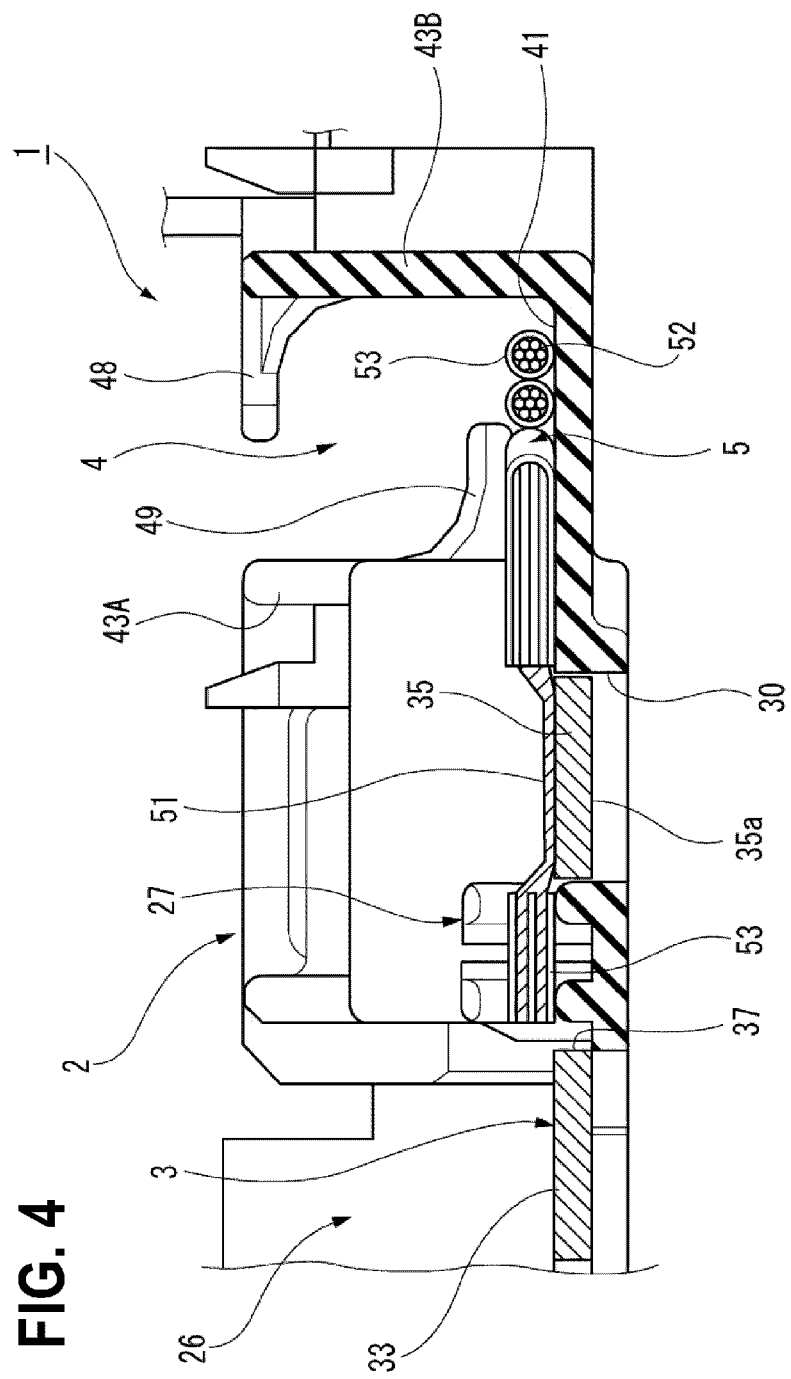
FIG. 4 is a sectional view showing the bus bar module on line IV-IV in FIG. 3.
Figure 5:
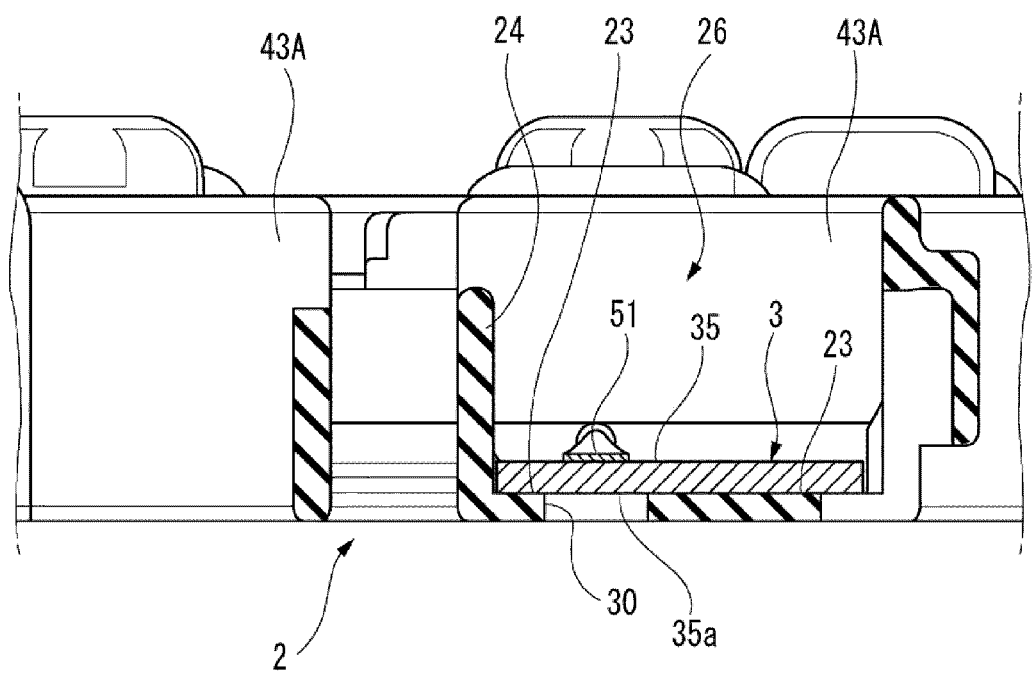
FIG. 5 is a sectional view showing the bus bar module on line V-V in FIG. 3.

As shown in FIG. 4, an electric wire seizing portion 48 is integrally formed at the upper edge of the side wall 43B of each electric wire routing portion 4. The electric wire seizing portion 48 is formed into a plate-like shape, which protrudes horizontally from the upper edge of the side wall 43B toward the other side wall 43A. The electric wire seizing portion 48 is formed in an approximately intermediate portion in the longitudinal direction of each electric wire routing portion 4. The electric wire seizing portion 48 serves for suppressing the floating of the voltage detection wires 5 received in the electric wire routing portion 4 to thereby enhance the reception work.

On the other hand, an electric wire holding portion 49 is integrally formed in the inner surface of the side wall 43A or the side wall 43B in the electric wire routing portion 4. The electric wire holding portion 49 is formed into a plate-like shape, which protrudes in parallel with the bottom wall 41 from the inner surface of the side wall 43A or the side wall 43B so as to provide a space in which the voltage detection wires 5 can be held between the electric wire holding portion 49 and the bottom wall 41. Due to the electric wire holding portion 49, intermediate parts of the voltage detection wires 5 extending from the tip portions of the voltage detection wires 5 held in the electric wire tip holding portion 27 of the bus bar reception portion 26 can be retained in the electric wire routing portion 4 in the state where the intermediate parts have been bent at least once.

Further, the electric wire routing portion 4 is covered with a lid portion 42 having a rectangular plate-like shape so as to close an upper opening of the electric wire routing portion 4. Of the opposite edge portions (long side portions) of the lid portion 42, a part of one edge portion is rotatably connected to one side wall 43A of the electric wire routing portion 4 through a hinge 44.

Here, adjacent ones of the bus bar reception portions 26 are connected to each other by a hinge 25, which is an elastic connection member having a hinge function (expansion/contraction). The hinge 25 can adjust the distance between adjacent ones of the bus bar reception portions 26 to thereby absorb the tolerance of the battery pitch.

Each voltage detection wire 5 as an electric wire to be routed in the routing space of the electric wire routing portion 4 is a coated electric wire in which a core wire 52 as a conductor has been coated with an insulating coating 53. At one end of the voltage detection wire 5, a tip part in which the insulating coating 53 has been peeled to expose the core wire 52 is welded with the surface of the conductor connection portion 35 as a welding connection portion 51. The other end of the voltage detection wire 5 is connected to a not-shown voltage detection circuit.

Incidentally, electric wires according to the invention are not limited to the coated electric wires in the embodiment. Various electric wires such as electric wires each having a single wire as a conductor coated with an insulating coating, a flat cable, etc. may be used.

Figure 6:
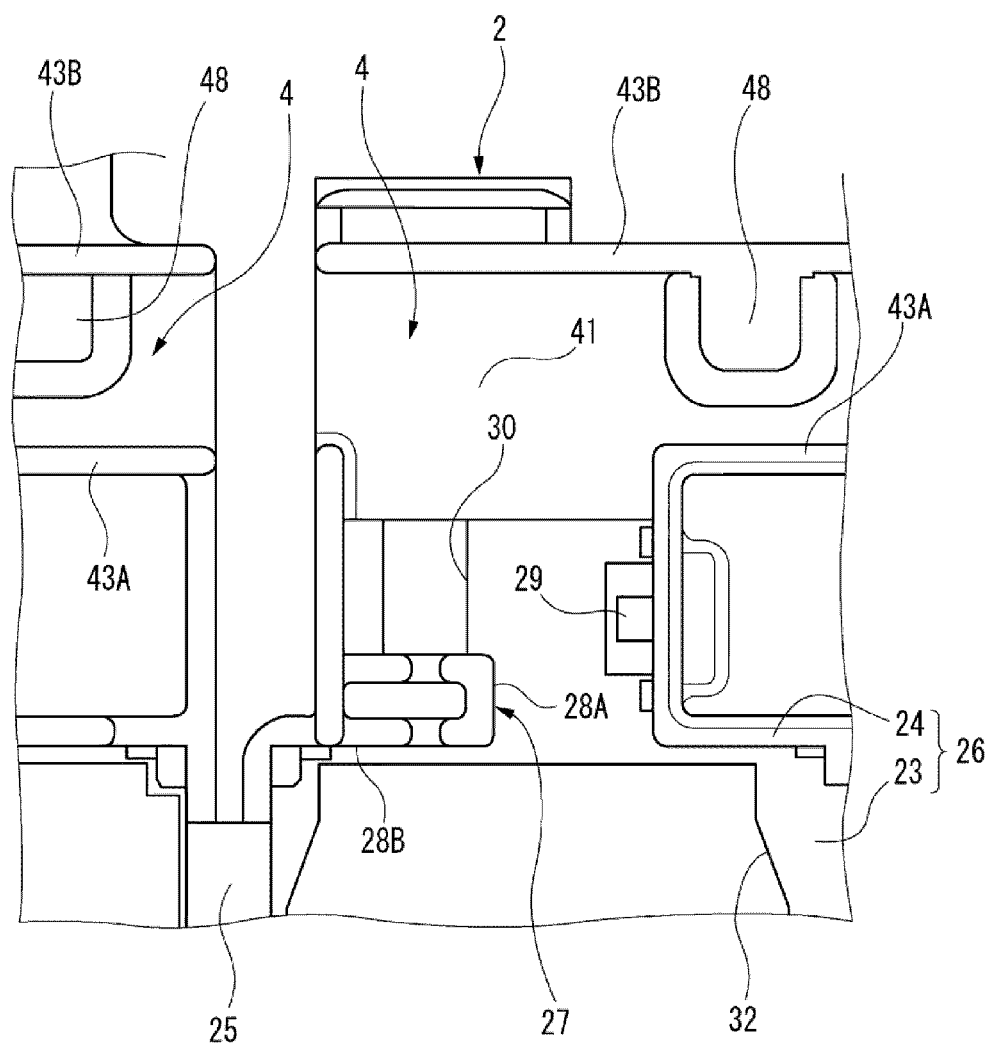
FIG. 6 is a plan view showing a bus bar reception portion of an electric wire router shown in FIG. 3.

As shown in FIG. 6, an electrode opening 32, an opening portion 30, and an electric wire tip holding portion 27 are provided in the bottom wall 23 of each bus bar reception portion 26. The electrode opening 32 is penetrated by a pair of a positive terminal and a negative terminal. The opening portion 30 is formed to be opposed to a back surface 35a of the conductor connection portion 35 in the bus bar 3 corresponding to a connection portion with a core wire 52 of a voltage detection wire 5. The electric wire tip holding portion 27 is provided adjacently to the opening portion 30 in order to hold the vicinity of the welding portion of the core wire 52.

The opening portion 30 is an opening through which the tip of an ultrasonic bonding anvil 61, which will be described later, can penetrate the bottom wall 23 from below the bus bar reception portion 26 and abut against the back surface 35a of the conductor connection portion 35. The opening portion 30 has a rectangular opening shape that is large enough to be penetrated by the anvil 61.

The electric wire tip holding portion 27 is constituted by a pair of clamping portions 28A and 28B each having two protrusions. The protrusions are provided vertically on the bottom wall 23, and opposed to each other. When a tip part of a voltage detection wire 5 is pressed in between the pair of clamping portions 28A and 28B from above, the electric wire tip holding portion 27 can hold the tip part.

Incidentally, in the tip part of the voltage detection wire 5 in the embodiment, the insulating coating 53 is peeled in the middle while the insulating coating 53 is left at the tip. Thus, the core wire 52 exposed in the middle serves as the welding connection portion 51. The electric wire tip holding portion 27 in the embodiment is disposed on the farther side from the electric wire routing portion 4 located near the opening portion 30 in order to hold the tip part of the voltage detection wire 5 on the tip side from the welding connection portion 51. In the tip part of the voltage detection wire 5, the insulating coating 53 is left as it is. Thus, in the electric wire tip holding portion 27, the pair of clamping portions 28A and 28B clamp the tip part of the voltage detection wire 5 where the insulating coating is left as it is, so that the tip part of the voltage detection wire 5 can be surely held to prevent the core wire 52 from separating.

Figure 8:
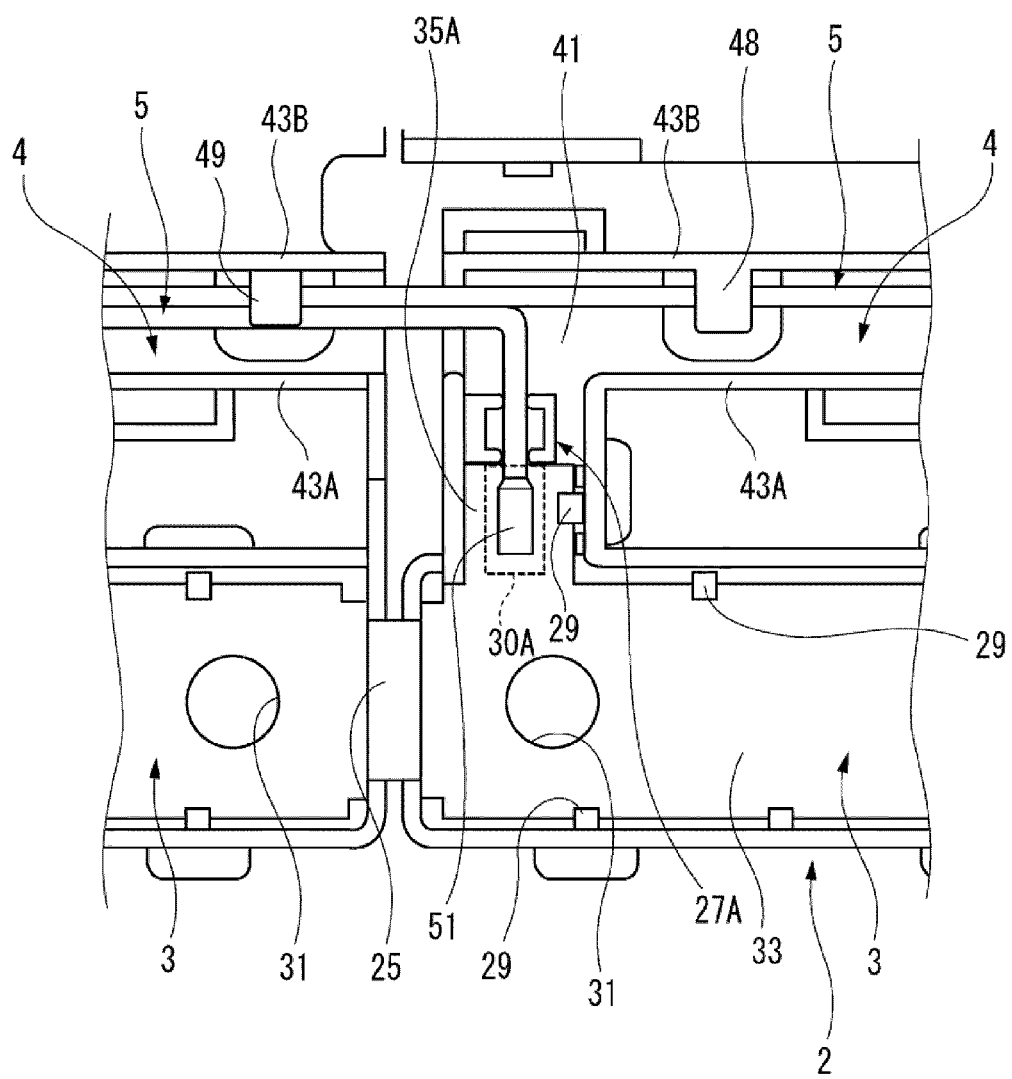
FIG. 8 is a plan view showing a modification of the bus bar reception portion of the electric wire router and a bus bar shown in FIG. 3.
Figure 9A:
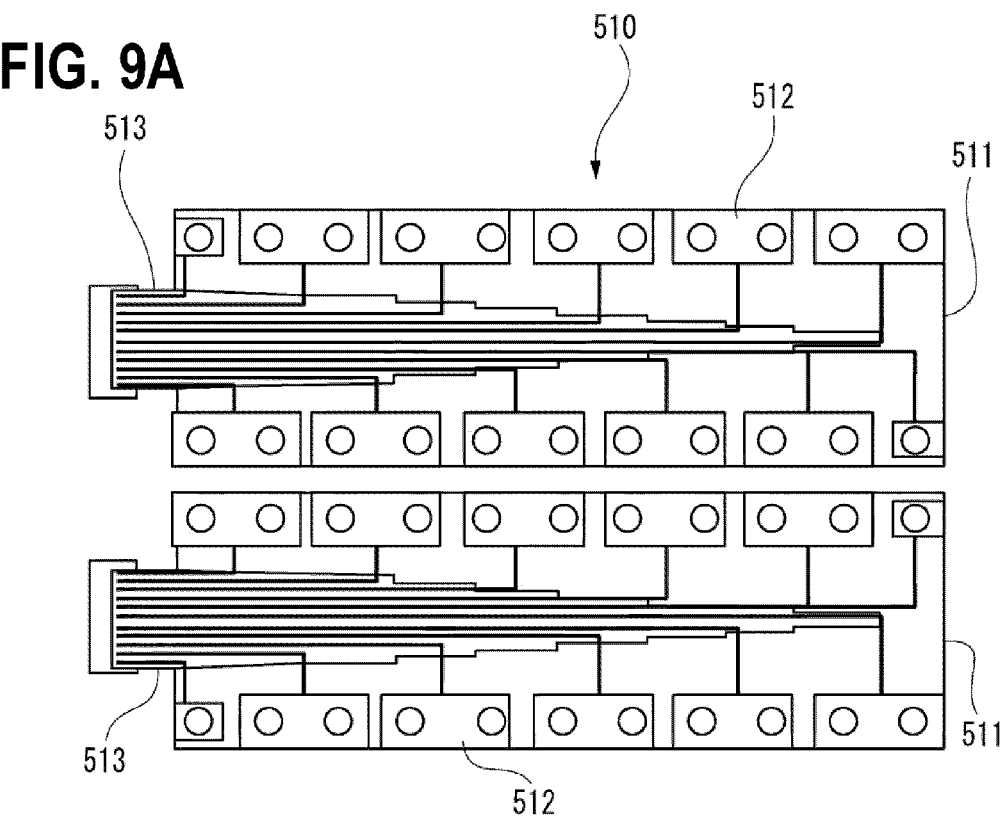
FIGS. 9A and 9B are views showing the configuration of a high voltage detection module device of a battery pack in the background art.
Figure 9B:
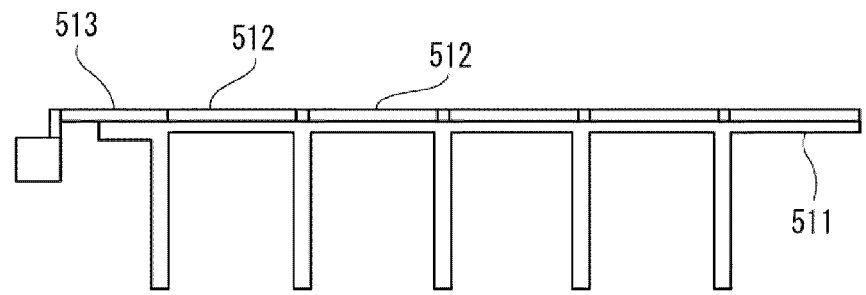

Here, an electric wire tip holding portion for holding the vicinity of a welding portion of a conductor according to the invention is not limited to the aforementioned electric wire tip holding portion 27 disposed adjacently to the opening portion 30 and on the far side from the electric wire routing portion 4. For example, as shown in FIG. 8, an electric wire tip holding portion 27A may be disposed adjacently to an opening portion 30A and on the closer side to the electric wire routing portion 4. In this case, the insulating coating 53 at the tip of the voltage detection wire 5 is peeled, and the core wire 52 exposed thus is held by the electric wire tip holding portion 27A. In addition, a conductor connection portion 35A does not have to avoid interference with the electric wire tip holding portion 27A. Therefore, the conductor connection portion 35A protrudes in an approximately rectangular shape from one side edge portion of the bus bar body portion 33.

In this manner, the electric wire tip holding portion in the invention may be disposed not adjacently to the opening portion but a little away from the opening portion if it is located near the welding portion of the core wire 52 so that the tip part of the voltage detection wire 5 can be positioned and held during welding work. That is, the electric wire tip holding portion may be disposed at any place on the bottom wall 23 around the opening portion.

In addition, the electric wire to be held by the electric wire tip holding portion in the invention is not limited to the core wire 52 in the middle where the insulating coating 53 has been peeled. Not to say, the core wire 52 in the part where the insulating coating 53 at the tip of the voltage detection wire 5 has been peeled may be held by the electric wire tip holding portion. In addition, as shown in FIG. 8, the insulating coating 53 left after the insulating coating 53 has been peeled at the tip may be held by the electric wire tip holding portion 27A.

In the inner surface of the circumferential wall 24 of the bus bar reception portion 26, a plurality of locking portions 29 for locking the circumferential edge of the bus bar 3 to thereby lock the bus bar 3 to the electric wire router 2 are provided at predetermined intervals. Each locking portion 29 in the embodiment is a locking lance that includes a locking protrusion at the tip of a flexible piece.

Next, a method for manufacturing the aforementioned bus bar module 1 will be described.

(Step of Receiving Bus Bars).

First, the bus bars 3 are received respectively in the bus bar reception portions 26 of the electric wire router 2 in which the bus bar reception portions 26 and the electric wire routing portions 4 have been integrally formed out of insulating resin. The bus bars 3 received in the bus bar reception portions 26 are locked to the electric wire router 2 by the locking portions 29 provided in the circumferential walls 24 of the bus bar reception portions 26 respectively.

(Step of Receiving Electric Wires)

Next, at one end, the voltage detection wires 5 in each of which the insulating coating 53 has been peeled to expose the core wire 52 in the middle while leaving the insulating coating 53 at the tip are received in each electric wire routing portion 4. Floating of the voltage detection wires 5 received in the electric wire routing portion 4 can be suppressed by the electric wire seizing portion 48.

(Step of Holding Vicinity of Welding Portion of Each Electric Wire)

The tip of each voltage detection wire 5 is pressed in between the pair of clamping portions 28A and 28B from above, so that the vicinity of the core wire 52 exposed in the voltage detection wire 5 can be held by the electric wire tip holding portion 27.

The voltage detection wire 5 is pressed in and clamped between the electric wire holding portion 49 and the bottom wall 41 in the electric wire routing portion 4 so that an intermediate part of the voltage detection wire 5 extending from the tip portion of the voltage detection wire 5 whose tip has been held by the electric wire tip holding portion 27 of the bus bar reception portion 26 can be retained in a loosened state where the intermediate part has been bent at least once.

Incidentally, either of the "step of receiving electric wires" and the "step of holding vicinity of welding portion of each electric wire" may be performed first.

(Step of Welding and Connecting Connection Portions)

Next, the electric wire router 2 in which the bus bars 3 have been received in the bus bar reception portions 26 and the voltage detection wires 5 have been routed in the electric wire routing portions 4 and the bus bar reception portions 26 is set in an ultrasonic bonding apparatus.

As shown in FIG. 7A, a tip of an ultrasonic bonding anvil (second work) disposed on the back surface side of each bus bar 3 is passed through the opening portion 30 of the bottom wall 23 from below the bus bar reception portion 26, and brought into contact with the back surface 35a of the conductor connection portion 35 in the bus bar 3.

Then, as shown in FIG. 7B, an ultrasonic bonding horn 63 (first work) disposed on the front surface side of the bus bar 3 so as to be opposed to the anvil 61 is moved down and pressed onto the core wire 52 of the voltage detection wire 5 disposed in the conductor connection portion 35 of the bus bar 3. In this state, the horn 63 is vibrated. Thus, the connection portion with the core wire 52 of the voltage detection wire 5 to be welded and connected to the surface of the bus bar 3 is welded and connected while the bus bar 3 is clamped by the horn 63 that has been brought into contact with the core wire 52, and the anvil 61 that has been passed through the opening portion 30 of the bus bar reception portion 26 and brought into contact with the back surface 35*a* of the conductor connection portion 35 in the bus bar 3.

Here, when the horn 63 is brought into contact with the connection portion between the core wire 52 and the conductor connection portion 35 of the bus bar 3, the anvil 61 can be brought into contact with the back surface 35*a* of the conductor connection portion 35 so as to clamp the bus bar 3 directly. Thus, the core wire 52 and the bus bar 3 can be welded with each other stably.

Next, when welding connection is completed by welding the core wire 52 with the conductor connection portion 35 as the welding connection portion 51, the horn 63 is moved up and the anvil 61 is moved down so that the ultrasonic bonding apparatus enters a standby state, as shown in FIG. 7B. Then, the electric wire router 2 is moved in the longitudinal direction to oppose the horn 63 to the core wire 52 of the voltage detection wire 5 routed in the bus bar reception portion 26 adjacent to the bus bar reception portion 26 in which welding connection of the welding connection portion 51 is completed, while the anvil 61 is opposed to the back surface 35*a* of the conductor connection portion 35. Thus, the ultrasonic bonding apparatus enters a welding work start state.

In this manner, the bus bars 3 are received in the bus bar reception portions 26 of the electric wire router 2 respectively in advance, and the core wires 52 of the voltage detection wires 5 are set in the conductor connection portions 35 of the bus bars 3 respectively. In this state, welding can be performed sequentially.

As has been described above, according to the bus bar module 1 according to the embodiment, each bus bar reception portion 26 has the opening portion 30 opposed to the back surface 35*a* of the conductor connection portion 35 corresponding to the connection portion with the core wire 52 of the voltage detection wire 5 in the surface of the bus bar 3. Thus, when the ultrasonic bonding horn 63 is brought into contact with the connection portion with the core wire 52, the anvil 61 can be brought into the back surface 35*a* of the conductor connection portion 35 to thereby clamp the bus bar 3 directly. As a result, the core wire 52 and the bus bar 3 can be welded with each other stably so that the reliability in electric connection in the welding portion can be improved.

Further, the vicinity of the welding portion of the core wire 52 is held by the electric wire tip holding portion 27. It is therefore unnecessary to perform positioning by a jig or the like during the welding work. Before the welding connection, the core wire 52 of the voltage detection wire 5 and the bus bar 3 can be routed in the bus bar reception portion 26. To route an electric wire in the background art, a bus bar to which a core wire of a voltage detection wire has been welded is received in a bus bar reception portion. However, it is not necessary to take into consideration a load which may be applied to the welding portion during the routing work in the background art. As a result, in the bus bar module 1 according to the embodiment, it will go well only if strength required for reliability in electric connection in the welding portion can be secured. Thus, an effect to simplify the structure of a product and an effect to reduce the cost can be expected.

Further, according to the bus bar module 1 according to the embodiment, the electric wire holding portion 49 of the electric wire routing portion 4 holds the intermediate part of the voltage detection wire 5 extending from the tip portion side of the core wire 52 held by the electric wire tip holding portion 27 in a loosened state where the intermediate part has been bent at least once. Thus, it is possible to reduce the load of the horn 63 when vibration for ultrasonic bonding is applied to the connection portion with the core wire 52. That is, when the voltage detection wire 5 is held in the loosened state, the core wire 52 in the connection portion can be vibrated so easily that ultrasonic vibration energy of the horn 63 can be transmitted efficiently.

In addition, according to the method for manufacturing the bus bar module 1 according to the embodiment, before the bus bar 3 and the core wire 52 of the voltage detection wire 5 are welded and connected to each other, the bus bar 3 can be received in the bus bar reception portion 26, and the voltage detection wire 5 can be routed in the electric wire routing portion 4 and the bus bar reception portion 26. Therefore, welding can be performed sequentially in the state where the bus bars 3 have been received in the bus bar reception portions 26 respectively and the core wires 52 of the voltage detection wires 5 have been set in the electric wire router 2. Accordingly, the effect of reducing the cost can be expected in comparison with welding for a single shot at a time.

Incidentally, the aforementioned embodiment has been described along an example in which the bus bar 3 and the core wire 52 of the voltage detection wire 5 are welded and connected by an ultrasonic bonding apparatus provided with the horn 63 as a first work disposed on the front surface side of the bus bar 3, and the anvil 61 as a second work disposed on the back surface side of the bus bar 3. The invention is not limited thereto.

For example, the bus bar 3 and the core wire 52 of the voltage detection wire 5 can be also welded and connected by a resistance welding apparatus provided with a resistance welding electrode as a first work and a mating electrode as a second work. In this manner, it is possible to obtain similar operation and effect to those in the aforementioned method for manufacturing the bus bar module 1 by the ultrasonic bonding apparatus.

In addition, when the bus bar 3 and the core wire 52 of the voltage detection wire 5 are welded and connected by a laser welding apparatus, the vicinity of the welding portion of the core wire 52 can be also held by the electric wire tip holding portion 27. Accordingly, it is not necessary to perform positioning by a jig or the like during welding work. Thus, it is possible to prevent lowering of reliability in electric connection or deterioration in workability of laser welding when the core wire 52 and the bus bar 3 are laser-welded.

According to the bus bar module 1 and the method for manufacturing the same according to the embodiment, it is therefore possible to improve the reliability of electric connection in the welding portion between the core wire 52 and the bus bar 3, and it is possible to enhance the workability of welding to thereby reduce the manufacturing cost.

Here, the features of the aforementioned embodiment of the method for manufacturing a bus bar module will be summarized and listed briefly below.

[1] A bus bar module (1) including a plurality of bus bars (3) that establish mutual electric connections among a plurality of unit cells of a battery assembly constituted by the unit cells, a plurality of electric wires (voltage detection wires 5) that are connected and welded to surfaces of the bus bars respectively, and an electric wire router (2) that is made of insulating resin, the electric wire router including a plurality of bus bar reception portions (26), the bus bar reception portions being provided side by side in an array direction of the unit cells, the bus bars being received in the bus bar reception portions respectively; wherein each of the bus bar reception portions includes:

an opening portion (30) that is formed to be opposed to a back surface (back surface 35a of a conductor connection portion 35) of a corresponding one of the bus bars in accordance with a connection portion with a conductor (core wire 52) of a corresponding one of the electric wires; and an electric wire tip holding portion (27) that is provided adjacently to the opening portion so as to hold the vicinity of a welding portion of the conductor.

[2] A bus bar module (1) according to the aforementioned paragraph [1], wherein:

the electric wire router includes electric wire routing portions (4) that receive the electric wires in a stacking direction of the unit cells; and each of the electric wire routing portions includes an electric wire holding portion (49) that holds the electric wire extending from the tip portion side of the conductor held by a corresponding one of the electric wire tip holding portions in a state where the electric wire has been bent at least once.

[3] A method for manufacturing a bus bar module (1) including a plurality of bus bars (3) that establish mutual electric connections among a plurality of unit cells of a battery assembly constituted by the unit cells, a plurality of electric wires (voltage detection wires 5) that are connected and welded to surfaces of the bus bars respectively, and an electric wire router (2) including electric wire routing portions (4) that receive the electric wires in a stacking direction of the unit cells, and a plurality of bus bar reception portions (26) that are provided side by side in an array direction of the unit cells, the bus bars being received in the bus bar reception portions, the method including the steps of:

receiving the bus bars in the bus bar reception portions;

receiving the electric wires in the electric wire routing portions;

holding the vicinity of a welding portion of each of the electric wires by an electric wire tip holding portion (27) of a corresponding one of the bus bar reception portions; and welding and connecting a connection portion with a conductor (core wire 52) of each of the electric wires to be welded and connected to surfaces of the bus bars respectively while clamping each of the bus bars between a first work (horn 63) brought into the conductor and a second work (anvil 61) passed through an opening portion (30) of a corresponding one of the bus bar reception portions and brought into a back surface (back surface 35a of a conductor connection portion 35) of the bus bar.

Incidentally, the invention is not limited to the aforementioned embodiment, but deformations, improvements, etc. can be made suitably. In addition, materials, shapes, dimensions, numbers, arrangement places, etc. of respective constituent elements in the aforementioned embodiment are not limited. Any materials, any shapes, any dimensions, any numbers, any arrangement places, etc. may be used as long as the invention can be attained.

What is claimed is:

1. A bus bar module comprising:

a plurality of bus bars that establish mutual electric connections among a plurality of unit cells of a battery assembly constituted by the unit cells;

a plurality of electric wires that are connected and welded to surfaces of the bus bars respectively; and an electric wire router that is made of insulating resin and includes a plurality of bus bar reception portions provided side by side in an array direction of the unit cells, the bus bars being received in the bus bar reception portions respectively, wherein each of the bus bar reception portions includes:

an opening portion that is formed to be opposed to a back surface of a corresponding one of the bus bars in accordance with a connection portion with a conductor of a corresponding one of the electric wires; and an electric wire tip holding portion that is made of the insulating resin and provided adjacently to the opening portion so as to hold the vicinity of a welding portion of the conductor, the electric wire tip holding portion includes a pair of clamping portions that are made of the insulating resin and opposed to each other, and the vicinity of the welding portion engages and is held between the pair of clamping portions.

2. The bus bar module according to claim 1, wherein the electric wire router includes electric wire routing portions that receive the electric wires in a stacking direction of the unit cells, and each of the electric wire routing portions includes an electric wire holding portion that holds the electric wire extending from the tip portion side of the conductor held by a corresponding one of the electric wire tip holding portions in a state where the electric wire has been bent at least one.

3. The bus bar module according to claim 1, wherein each of the clamping portions includes a pair of protrusions that made of the insulating resin and are opposed to each other.

* * * * *